United States Patent [19]
Pan

[11] Patent Number: 5,663,813
[45] Date of Patent: Sep. 2, 1997

[54] IMAGE SCANNING DEVICE MOUNTED TO COMPUTER CASE

[75] Inventor: Ampere Pan, Taipei HSien, Taiwan

[73] Assignee: Primax Electronics, Ltd., Taipei, Taiwan

[21] Appl. No.: 654,684

[22] Filed: May 29, 1996

[51] Int. Cl.[6] .................. H04N 1/04; H05K 5/00
[52] U.S. Cl. .......... 358/474; 358/473; 358/494; 358/496; 358/498; 361/683; 361/686
[58] Field of Search ............................ 358/473, 474, 358/487, 496, 498, 475, 484, 497, 296, 400, 448; 361/683, 684, 685, 686

[56] References Cited

U.S. PATENT DOCUMENTS

| | | | |
|---|---|---|---|
| 5,020,926 | 6/1991 | Wilhelm | 361/686 |
| 5,050,041 | 9/1991 | Shafi | 361/686 |
| 5,115,374 | 5/1992 | Hongoh | 361/684 |
| 5,499,108 | 3/1996 | Cotte et al. | 358/498 |
| 5,549,375 | 8/1996 | Pagliaccio | 361/684 |

Primary Examiner—Edward L. Coles, Sr.
Assistant Examiner—Mark Wallerson
Attorney, Agent, or Firm—Laff, Whitesel, Conte & Saret, Ltd.

[57] ABSTRACT

The present invention is related to an image scanning device mounted to a computer case, which includes a scanner housing having a first portion located inside the computer case and a second portion protruding through a surface of the computer case, a scanning passage essentially located in the second portion of the scanner housing for transmitting therethrough an object to be scanned, and an image sensing and processing device installed in the scanner housing for sensing an image of the object during the transmission of the object through the scanning passage and processing the sensed image. The scanning device according to the present invention is mounted to a computer case so that the extra space for resting thereon or moving therearound a sheetfed-type or a handheld-type scanner will not be needed any more. Moreover, the scanning device according to the present invention occupies relatively small space from the host computer, e.g. a disk drive space, but is suitable for scanning relatively large size of documents, e.g. A4-size documents.

13 Claims, 4 Drawing Sheets

IMAGE SCANNING DEVICE MOUNTED TO COMPUTER CASE

FIELD OF THE INVENTION

The present invention is related to an image scanning device, and more particularly to an image scanning device which is mounted to a computer case.

BACKGROUND OF THE INVENTION

In recent years, scanners are becoming more and more popular as computer peripheral equipment. Scanners are typically classified as sheetfed type and handheld type at the current stage. For both types of scanners, extra space near the computer to which the scanner is connected is needed for resting the scanner thereon or moving it therearound. In order to save working space, a scanner is designed to be mounted to a computer case, for example, at the location provided for a disk drive according to the present invention. When a scanner to be mounted to a computer case is designed, the current trend for requiring the minimization of the host computer should be simultaneously taken into consideration. In other words, the scanner had better occupy relatively small space from the host computer but be capable of scanning relatively large size of documents.

SUMMARY OF THE INVENTION

An object of the present invention is to provide an image scanning device which is mounted to a computer case to save the space for placing a sheetfed scanner thereon or moving a handheld scanner therearound.

Another object of the present invention is to provide an image scanning device mounted to a computer case, occupying reasonable space from the computer case and allowing various dimensions of documents to be scanned thereby.

In accordance with the present invention, an image scanning device mounted to a computer case includes a scanner housing having a first portion located inside the computer case and a second portion protruding through a surface of the computer case, a scanning passage essentially located in the second portion of the scanner housing for transmitting therethrough an object to be scanned, and an image sensing and processing device installed in the scanner housing for sensing an image of the object during the transmission of the object through the scanning passage and processing the sensed image.

Preferably, the first portion of the scanner housing is mounted to a disk drive space in the computer case and more preferably the disk drive space is a space for accommodating a 5¼-inch disk drive.

In a preferred embodiment according to the present invention, the computer case is an upright type.

Preferably, the width of an entrance of the scanning passage is greater than five and a quarter inches for allowing for example B5, A6 or A4-size documents to be transmitted therethrough.

In accordance with another aspect of the present invention, the image scanning device further includes a transmission device installed by the scanning passage for transmitting the object to be scanned through the scanning passage.

In accordance with another aspect of the present invention, the image sensing and processing device includes an optical device installed in the scanner housing for sensing the image of the object during the transmission of the object through the scanning passage and converting the sensed image into an analog electronic signal, and a signal processing device installed in the scanner housing for converting the analog electronic signal into a digital signal.

The optical device preferably includes a light source installed in the second portion of the scanner housing for illuminating the object to be scanned, at least one reflective mirror installed in the second portion of the scanner housing for reflecting the image of the object, a lens installed in the first portion of the scanner housing for focusing the reflected image by the reflective mirror, and a charge coupled device installed in the first portion of the scanner housing for converting the focused image into the analog electronic signal. In this case, the transmission device preferably includes two driving rollers installed by one side of the scanning passage and two driven rollers installed by the other side of the scanning passage for transmitting the object to be scanned through the scanning passage, and a driving device for enabling the rotation of the driving rollers. The driving device preferably includes a motor and gears.

Alternatively, the optical device can be a contact-type image sensor installed by one side of the scanning passage. In this case, the transmission device includes a transmission roller installed by the other side of the scanning passage for urging the object to be scanned against the contact-type image sensor and transmitting the object through the scanning passage, and a driving device for enabling the rotation of the transmission roller. The driving device preferably includes a motor and gears.

The foregoing objectives, features and functions of the present invention will be more readily understood upon a thoughtful deliberation of the following detailed description of two embodiments of the present invention in conjunction with the accompanying drawings.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1:
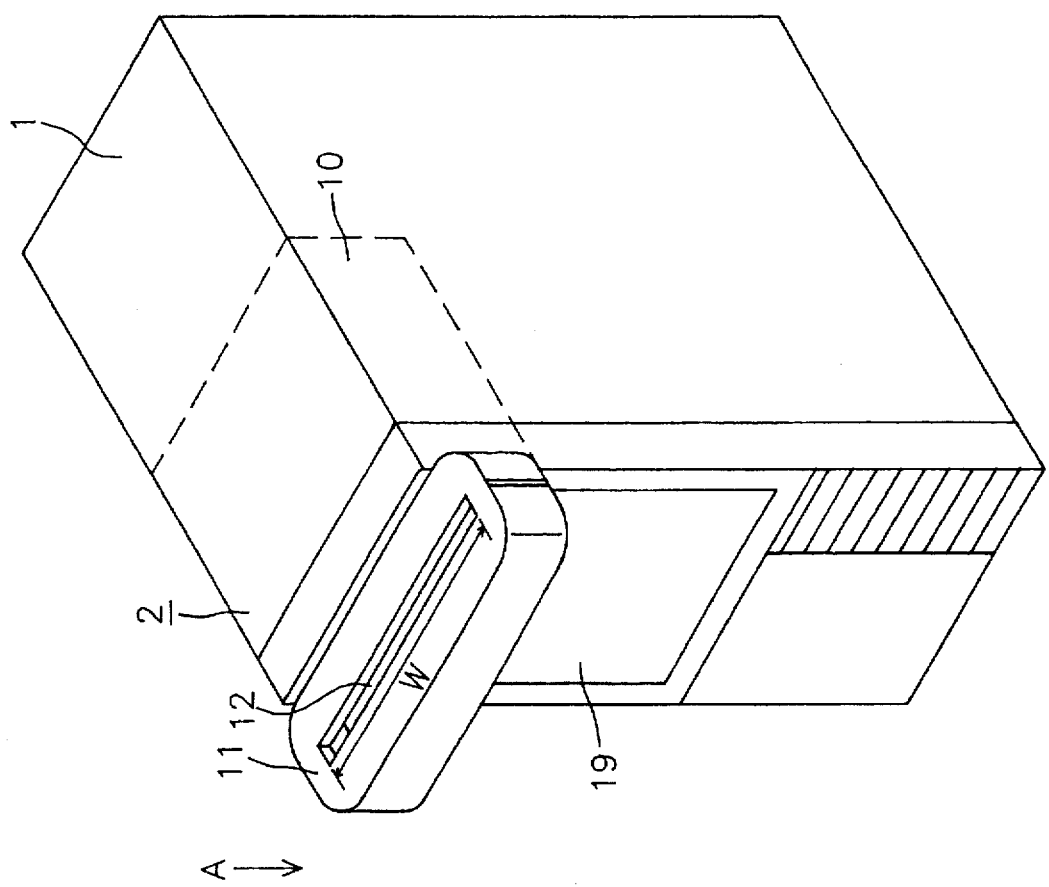
FIG. 1 schematically shows a preferred embodiment of an image scanning device and a computer case to which the image scanning device is mounted according to the present invention.

Please refer to FIG. 1 which schematically shows the outer appearance of a preferred embodiment of an image scanning device according to the present invention. It is shown that the scanner housing 2 of the image scanning device partially installed into a computer case 1 includes two portions 10 and 11. The first portion 10 is arranged inside the computer case 1 and the second portion 11 protrudes through the surface 19 of the computer case 1. In this preferred embodiment, the first portion 10 is installed in a disk drive space for accommodating a 5¼-inch disk drive. Of course, the first portion 10 can also be installed in a disk drive space for accommodating a 3½-inch disk drive or in a specially designed space. The second portion 11 includes a scanning passage 12 for transmitting therethrough an object to be scanned in a direction indicated by arrow "A". In this preferred embodiment shown in FIG. 1, the width W of the scanning passage 12 is greater than 5¼ inches, the tray width of the disk drive, so that a paper document having a width greater than 5¼ inches can be transmitted through the scanning passage 12 to be scanned. For example, the width of the scanning passage 12 can be designed to be 8¼ inches to allow A4-size or smaller, e.g. A6 or B5-size, paper documents to be scanned.

In general, the host computer case 1 is preferably an upright-type one because it has a larger space for the movement of the scanned object. On the other hand, the transmission direction can be horizontal if the space for accommodating the present scanning device is uprightly rectangular.

Figure 2:
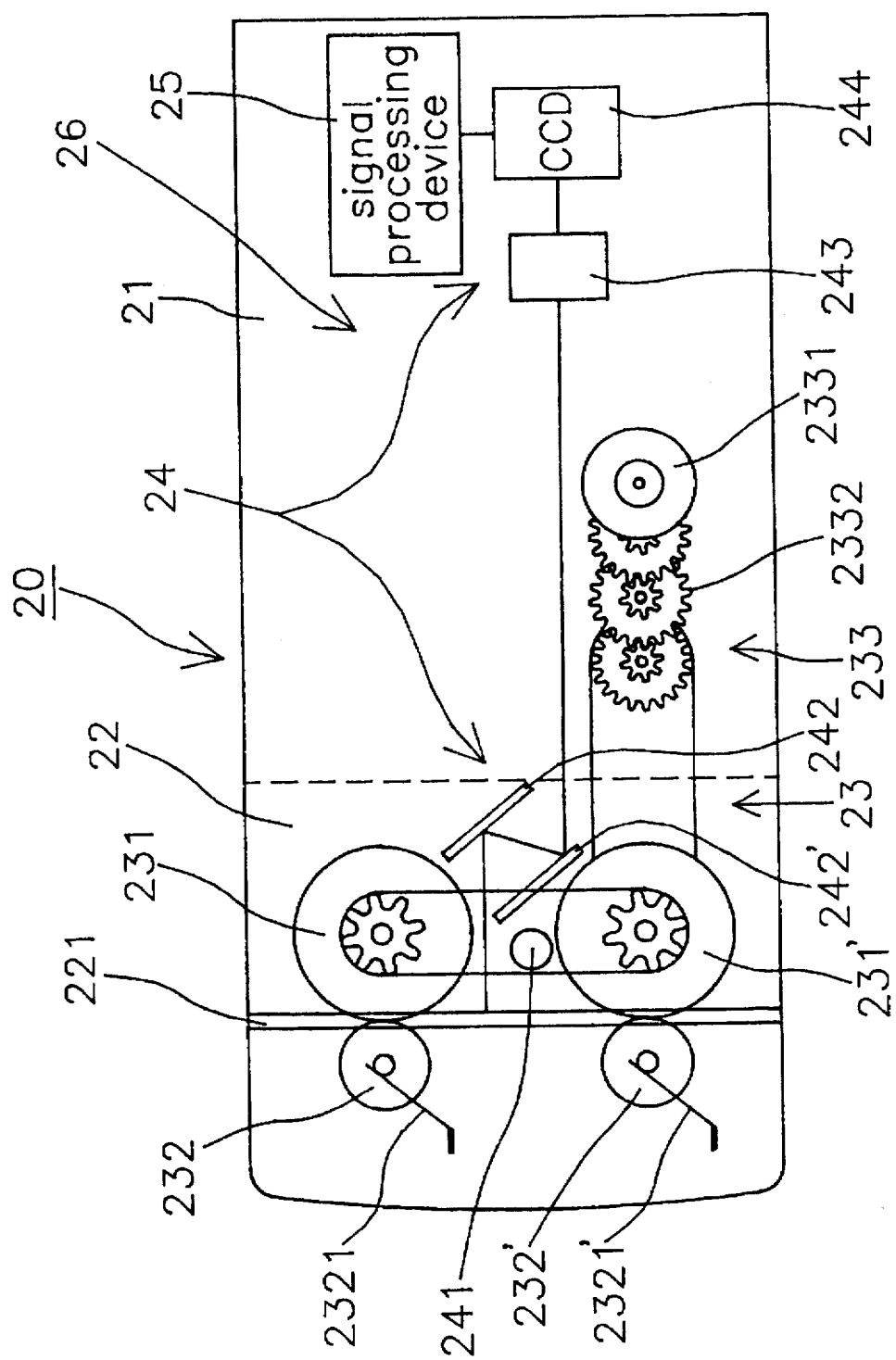
FIG. 2 is a schematic side elevational view of a preferred embodiment of an image scanning device according to the present invention.

Please refer to FIG. 2 which is a schematic side elevational view of a preferred embodiment of an image scanning device according to the present invention. It is shown in the figure a scanner housing 20 having a first portion 21 to be mounted to a computer case and a second portion 22 to protrude through a surface of the computer case, a scanning passage 221 located in the second portion 22 of the scanner housing 20 for transmitting therethrough an object to be scanned, a transmission device 23 installed by the scanning passage 221 in the scanner housing 20 for transmitting the object thereby, and an image sensing and processing device 26 installed in the scanner housing 20 for sensing an image of the object during the transmission of the object through the scanning passage 221 and processing the sensed image.

Figure 3:
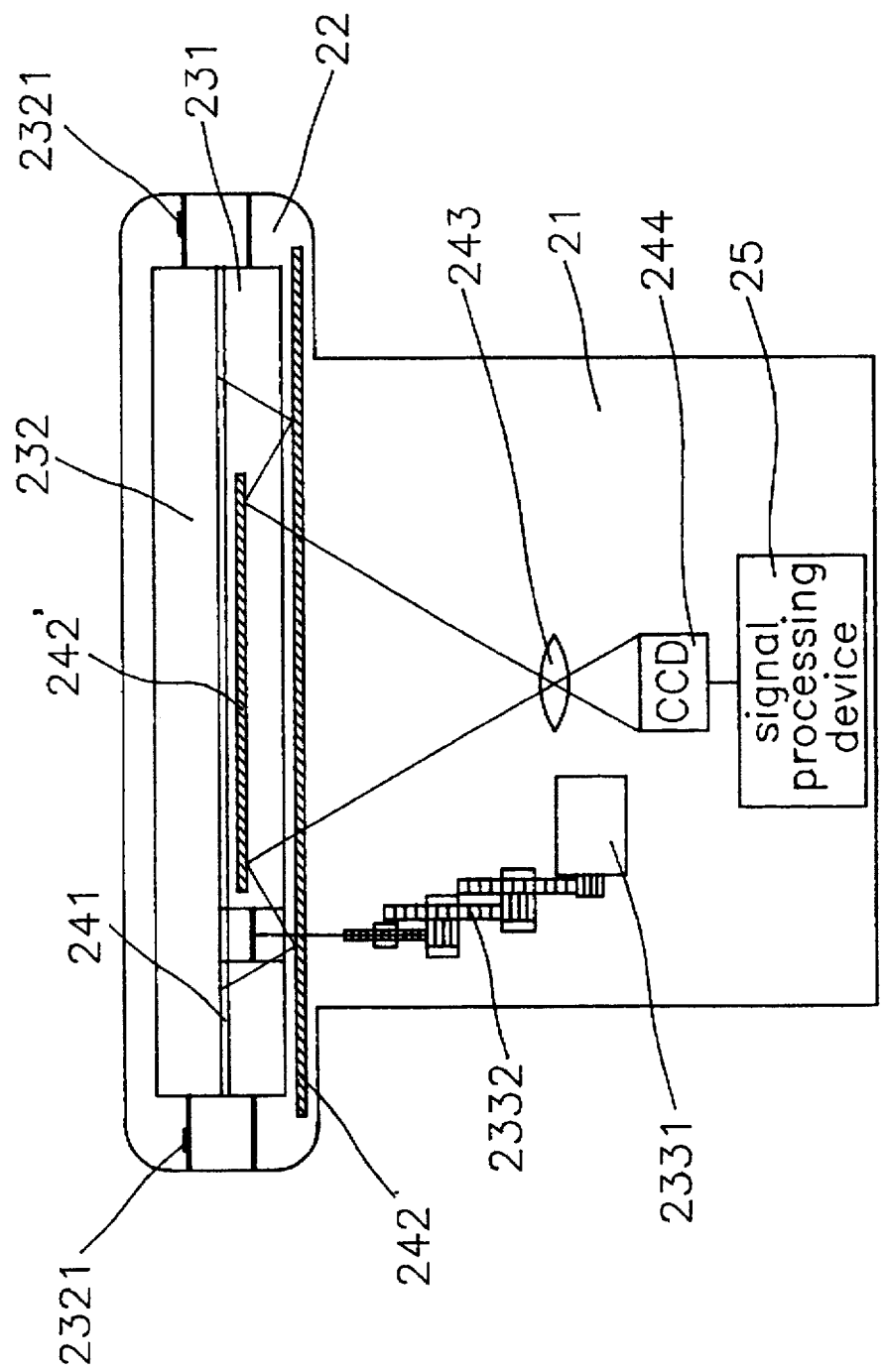
FIG. 3 is a top plane view of the image scanning device shown in FIG. 2.

With reference to FIG. 2 and FIG. 3 which is a top plane view of the image scanning device shown in FIG. 2, in this preferred embodiment, the image sensing and processing device 26 includes an optical device 24 for sensing the image of the object during the transmission of the object through the scanning passage 221 and converting the sensed image into an analog electronic signal, and a signal processing device 25 for receiving and converting the analog electronic signal into a digital one. The optical device 24 includes a light source 241 for illuminating the Object to be scanned, two reflective mirrors 242 and 242' for reflecting the image of the object, a lens 243 for focusing the image reflected by the reflective mirrors 242 and 242', and a charge coupled device (CCD) 244 for converting the focused image into the analog electronic signal. In this case, the transmission device 23 preferably, as shown in FIG. 2, includes two driving rollers 231 and 231' and two driven rollers 232 and 232' for cooperating to transmit the object to be scanned through the scanning passage 221, and a driving device 233 consisting of a motor 2331 and a group of gears 2322 for enabling the rotation of the driving rollers 231 and 231'. Preferably, the present scanning device further includes two resilient pieces 2321 and 2321' respectively engaged to urge against the driven rollers 232 and 232' for facilitating the close contact between the rollers and the object to be transmitted.

Figure 4:
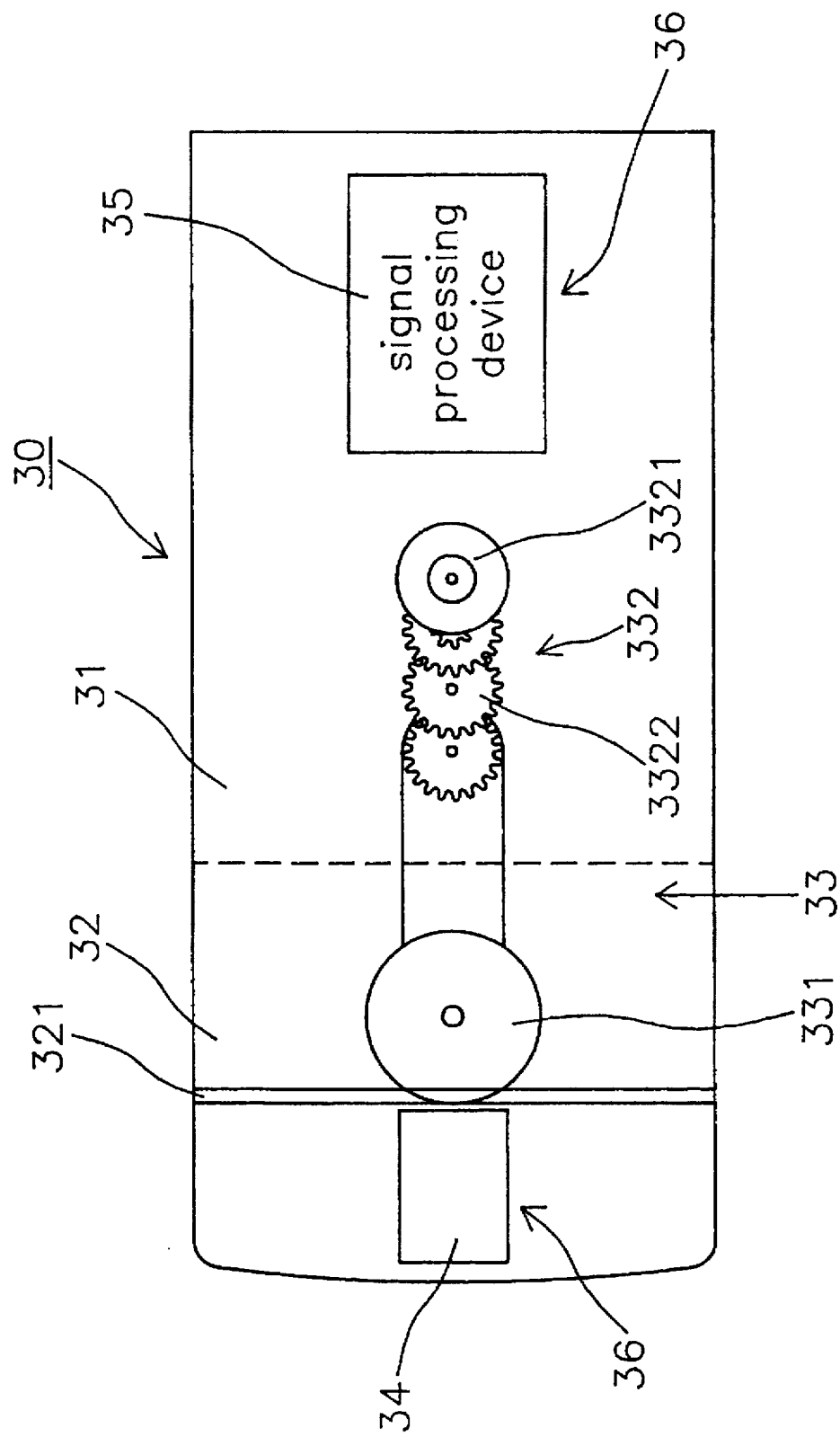
FIG. 4 is a schematic side elevational view of another preferred embodiment of an image scanning device according to the present invention.

Referring now to FIG. 4 which is a schematic side elevational view of another preferred embodiment of an image scanning device according to the present invention. The scanning device according to the present invention shown in FIG. 4 includes a scanner housing 30 having a first portion 31 to be mounted to a computer case and a second portion 32 to protrude through a surface of the computer case, a scanning passage 321 located in the second portion 32 of the scanner housing 30 for transmitting therethrough an object to be scanned, a transmission device 33 installed by the scanning passage 321 in the scanner housing 30 for transmitting the object thereby, and an image sensing and processing device 36 installed in the scanner housing 30 for sensing an image of the object during the transmission of the object through the scanning passage 321 and processing the sensed image, which is similar to the preferred embodiment shown in FIG. 2. Also, the image sensing and processing device 36 includes an optical device 34 for sensing the image of the object during the transmission of the object through the scanning passage 321 and converting the sensed image into an analog electronic signal, and a signal processing device 35 for receiving and Converting the analog electronic signal into a digital one.

However, a contact-type image sensor (CIS) is used as the optical device 34 in this preferred embodiment. For complying with the CIS, the transmission device 33 used in this preferred embodiment includes a transmission roller 331 for urging the object to be scanned against the CIS 34 and transmitting the object through the scanning passage 321, and a driving device 332 consisting of a motor 3321 and a group of gears 3322 for enabling the rotation of the transmission roller.

To sum up, the scanning device according to the present invention is mounted to a computer case so that the extra space for resting thereon or moving therearound a sheetfed-type or a handheld-type scanner will not be needed any more. Moreover, the scanning device according to the present invention occupies relatively small space from the host computer, e.g. a disk drive space, but is capable of scanning relatively large size of documents, e.g. A4-size documents.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image scanning device mounted to a computer case, comprising:

a scanner housing having a first portion located inside said computer case and a second portion protruding through a surface of said computer case;

a scanning passage essentially located in said second portion of said scanner housing for transmitting therethrough an object to be scanned; and an image sensing and processing device installed in said scanner housing for sensing an image of said object during the transmission of said object through said scanning passage and processing said sensed image.

2. The image scanning device according to claim 1 wherein said first portion of said scanner housing is mounted to a disk drive space in said computer case.

3. The image scanning device according to claim 2 wherein said disk drive space is a space for accommodating a 5¼-inch disk drive.

4. The image scanning device according to claim 1 wherein said computer case is an upright type.

5. The image scanning device according to claim 1 wherein the width of an entrance of said scanning passage is greater than five and a quarter inches.

6. The image scanning device according to claim 1 further comprising a transmission device installed by said scanning passage for transmitting said object to be scanned through said scanning passage.

7. The image scanning device according to claim 6 wherein said image sensing and processing device includes:

an optical device installed in said scanner housing for sensing said image of said object during the transmission of said object through said scanning passage and converting said sensed image into an analog electronic signal; and a signal processing device installed in said scanner housing for converting said analog electronic signal into a digital signal.

8. The image scanning device according to claim 7 wherein said optical device includes:

a light source installed in said second portion of said scanner housing for illuminating said object to be scanned;

at least one reflective mirror installed in said second portion of said scanner housing for reflecting said image of said object;

a lens installed in said first portion of said scanner housing for focusing said reflected image by said reflective mirror; and a charge coupled device installed in said first portion of said scanner housing for converting said focused image into said analog electronic signal.

9. The image scanning device according to claim 8 wherein said transmission device includes:

two driving rollers installed by one side of said scanning passage and two driven rollers installed by the other side of said scanning passage for transmitting said object to be scanned through said scanning passage; and a driving device for enabling the rotation of said driving rollers.

10. The image scanning device according to claim 9 wherein said driving device includes a motor and gears.

11. The image scanning device according to claim 7 wherein said optical device is a contact-type image sensor installed by one side of said scanning passage.

12. The image scanning device according to claim 11 wherein said transmission device includes:

a transmission roller installed by the other side of said scanning passage for urging said object to be scanned against said contact-type image sensor and transmitting said object through said scanning passage; and a driving device for enabling the rotation of said transmission roller.

13. The image scanning device according to claim 12 wherein said driving device includes a motor and gears.

* * * * *